United States Patent [19]

Himeno

[11] 4,112,417
[45] Sep. 5, 1978

[54] APPARATUS FOR DETECTING LEAKAGE OF LIQUID SODIUM

[75] Inventor: Yoshiaki Himeno, Mito, Japan

[73] Assignee: Doryokuro Kakunenryo Kaihatsu Jigyodan, Tokyo, Japan

[21] Appl. No.: 723,637

[22] Filed: Sep. 15, 1976

[30] Foreign Application Priority Data

Sep. 18, 1975 [JP] Japan .............................. 50-112117

[51] Int. Cl.² .............................................. G08B 21/00
[52] U.S. Cl. ................................ 340/605; 73/40.5 R; 73/49.1
[58] Field of Search ................... 340/242, 244; 73/40, 73/40.5 R, 49.1

[56] References Cited

U.S. PATENT DOCUMENTS

| | | | |
|---|---|---|---|
| 3,721,970 | 3/1973 | Niemoth | 350/242 |
| 3,755,801 | 8/1973 | Milo | 340/244 R |
| 3,981,181 | 9/1976 | Ochiai | 73/40.5 R |

Primary Examiner—John W. Caldwell, Sr.
Assistant Examiner—Daniel Myer
Attorney, Agent, or Firm—Wenderoth, Lind & Ponack

[57] ABSTRACT

An apparatus for detecting the leakage of liquid sodium includes a cable-like sensor adapted to be secured to a wall of piping or other equipment having sodium on the opposite side of the wall, and the sensor includes a core wire electrically connected to the wall through a leak current detector and a power source. An accidental leakage of the liquid sodium causes the corrosion of a metallic layer and an insulative layer of the sensor by products resulted from a reaction of sodium with water or oxygen in the atmospheric air so as to decrease the resistance between the core wire and the wall. Thus, the leakage is detected as an increase in the leaking electrical current. The apparatus is especially adapted for use in detecting the leakage of liquid sodium from sodium-conveying pipes or equipment in a fast breeder reactor.

11 Claims, 2 Drawing Figures

AUSTENITE STAINLESS STEEL, COPPER OR PLAIN CARBON STEEL

MAGNESIUM OXIDE, BERYLLIUM OXIDE, OR ALUMINUM OXIDE

APPARATUS FOR DETECTING LEAKAGE OF LIQUID SODIUM

BACKGROUND OF THE INVENTION

The present invention relates to an apparatus for detecting the leakage of liquid sodium and, more particularly, to such an apparatus capable of the presence of detecting leakage as a change in electrical leak current. Still more particularly, the invention relates to an apparatus for rapidly detecting the leakage of coolant in a sodium-cooled nuclear reactor.

Because of low vapour pressure, an excellent performance as a heat transfer medium, good stability against radioactive rays and of particularly small slowing-down power, liquid sodium is popularly used in fast breeder reactors and systems associated therewith. In such facilities, it is necessary to detect the leakage of the liquid sodium from essential parts promptly and securely, which demands the development of a detecting apparatus of moderate cost.

Conventionally, there are typically employed three methods for detecting the leakage of liquid sodium.

The first known method is to use the so-called electrode type detector consisting of a ceramic-insulated tube accomodating a metal wire, while the second known method utilizes a smoke detector sensitive to the smoke of sodium oxide which results from the leakage, and the third known method is to utilize a hydrogen detector sensitive to hydrogen gas which is produced as a resultant of the reaction of the sodium and atmospheric water vapour.

These known measures have been found, however, to be inconvenient or unsatisfactory for the reasons discussed below. Namely, the first method is not capable of immediate detection of the leak, because the elctrode-type detector is sensitive only to a relatively large quantity of sodium leakage, and also is likely to respond to electrically conductive substances other than sodium. In addition, the detector of this type cannot be placed at any desired location due to the structure thereof. In the second method described above, the detector tends to by erroneously operated or actuated by smoke from sources other than sodium oxide. The smoke detector is often invalid because only a part of the leaked sodium passes through the heat insulator surrounding the leaking point to the atmosphere to generate the smoke. The third method requires an expensive detector and thus is not practical when a large number of detectors in numerous places is necessary.

SUMMARY OF THE INVENTION

The object of the present invention is to provide an apparatus capable of detecting the leakage of liquid sodium from pipes or equipment of a system in which liquid sodium is contained or circulated, which detects the leakage as a change in an electrical current, and which can be easily set at any desired position in the system.

According to the invention, there is provided an apparatus for detecting the leakage the liquid sodium comprising a sensor in the form of a cable having an electrically conductive wire surrounded by an insulative or insulation layer which in turn is sealed by a metallic layer. The insulative and the metallic layers consist of a metal oxide and a metal, respectively, which are corrodible by substances resulted from a reaction of the liquid sodium with the water or oxygen in the atmospheric air. The cable-like sensor is secured to any desired place such as walls of the pipes and the equipment of the sodium-circulating system. An electrical power supply and a leak current detector are inserted between the wall of the pipe and the core wire of the sensor.

If there is a leakage of liquid sodium, the resultant reaction products corrode the metallic layer and the insulative layer, so that the electrical resistance between the wire and the wall is decreased. This decrease is sensed as a change in the electrical current passing through the detector.

The apparatus of the invention as stated above can conveniently be applied to any desired place or part of the system through which liquid sodium is circulated, and can detect the leakage of sodium surely and swiftly. Therefore, the apparatus of the invention is especially suitable to be used in monitoring or early detection of leakage of sodium in a system using a large quantity of liquid sodium, for example, such as a fast breeder reactor.

It is, therefore, an object of the invention to provide a novel and improved apparatus for detecting the leakage of liquid sodium.

It is another object of the invention to provide an apparatus which is capable of surely and swiftly detecting the leakage of liquid sodium and which may be manufactured at a low cost.

It is still another object of the invention to provide an apparatus capable of detecting even a small quantity of leakage of sodium in a sodium cooled reactor.

Other objects, features and advantages of the invention will be more fully understood from the following description in conjunction with the attached drawings.

DETAILED DESCRIPTION OF THE PREFERRED EMBODIMENT

Figure 1:
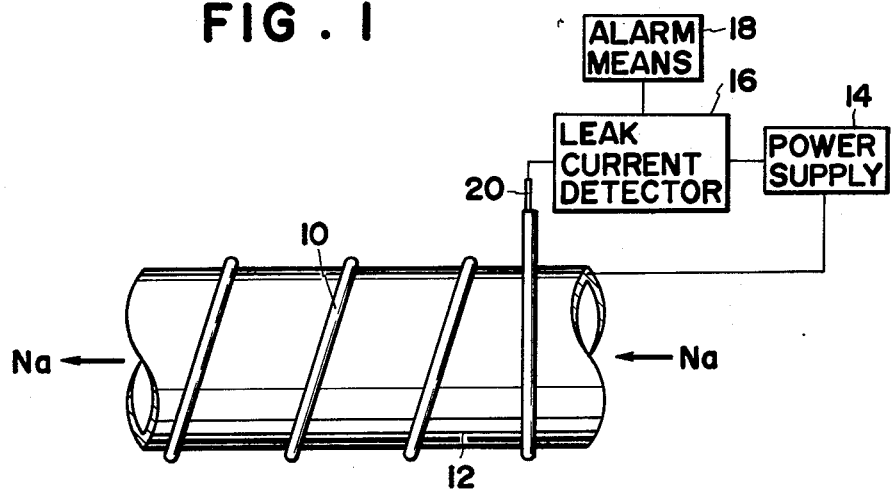
FIG. 1 is a schematic illustration of an apparatus embodying the present invention.

Referring to FIG. 1, a sensor 10 for detecting leaked sodium has an elongated cable-like form, and is adapted to be directly secured to or wound around the wall 12 of a pipe or equipment through which sodium is conveyed or circulated.

Figure 2:
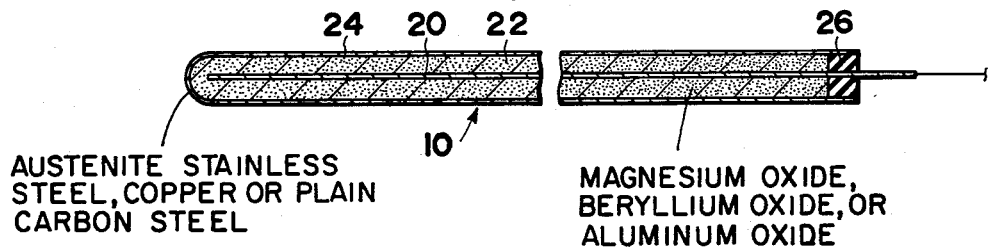
FIG. 2 is an enlarged sectional view of a sensor of the apparatus of FIG. 1.

An electrical power supply 14 and a leak current detector 16 are connected in series between a core wire of the cable-like sensor and the wall 12. An alarm 18 is connected to the detector 16. As will be seen from FIG. 2, the sensor 10 consists of a central core wire 20 surrounded by an insulative layer 22 which in turn is covered by a metallic layer 24. Both ends of the sensor 10 are closed or sealed by the metallic layer 24 or by using additional sealing members 26.

The metallic layer 24 and the insulative layer 22 are made of materials which are easily corroded by the reaction products resulted from the reaction of the liquid sodium with the water or oxygen in the atmospheric air. For example, the metallic layer may be made of austenite stainless steel, copper or plain carbon steel, while the insulative layer may be made of metal oxide such as magnesium oxide, beryllium oxide or aluminium oxide.

The electrical power supply 14 may be of the A.C. or D.C. type capable of applying a constant voltage between the core wire 20 of the sensor 10 and the wall 12 of the pipe or equipment.

The leak current detector 16 comprises a highly sensitive digital or analog ammeter to measure the current passing therethrough and/or a comparator comparing the voltage drop due to the leak current flow with an adjustable reference voltage. The comparator may conveniently be connected to alarm 18 such as an alarm lamp or buzzer so as to energize the later by an output from the comparator.

Hereinafter, the manner of installation and operation of the illustrated embodiment will be described.

As aforementioned, the cable-like sensor 10 is wound directly around the wall 12 of the pipe or equipment. In a case where it is difficult to so wind the sensor around the wall, for example when the sensor is to be secured to the bottom of a sodium tank, the sensor may be bent in the form of, for example, a planar whirlpool or zigzag to be directly secured to the objective plane surface of the tank bottom.

In operation, a constant voltage is applied between the wall 12 and the core wire 20 of the sensor, by the power supply 14. In the case of no leakage of sodium, the insulative layer 22 is kept sound and provides a very high resistance which is typically on the order of several MΩ which is sufficient to limit the electric leak current to 1mA or less. If the leak current detector 16 is sensitive enough to measure such a small leak current as 1mA, the leak current is indicated on the detector, so that the absence of sodium leakage can be determined by monitoring the reading indicated on the detector as being less than that of a reference current. When the leak current detector 16 includes a comparator, it is preferred to set the reference level for the comparator somewhat above the normal level of leak current so that the leakage of sodium may be automatically informed by the output from the comparator.

Once leakage of sodium occurs from the wall of the pipe or equipment, the high temperature of the leaked sodium promotes the reaction of the sodium with the water or oxygen in the atmospheric air, resulting the products such as a high-temperature sodium oxide or caustic soda which are highly chemically activate enough to corrode even austenite stainless steel which exhibits a high corrosion resistant property. Therefore, the metal layer 24 of the sensor 10 is corroded very soon and broken to expose the internal insulative layer 22. The insulative layer 22, because of having a high temperature, being an oxidized substance and having a large specific surface area, exhibits a vigorous reaction with the above mentioned reaction products to drastically decrease the electric resistance of the sensor 10. This reduced resistance causes an increase of the leak current which is sensed by the leak current detector 16 as an indication of the occurrence of the sodium leakage from the wall of the pipe or equipment. More strictly, if the leak current detector 16 is constituted solely by an ammeter, the leakage of sodium is represented by an extraordinarily high reading of the ammeter, while if a comparator is included in the leak current detector, the level of the output from the comparator is altered, as the detected current exceeds the reference level, thereby to energizing the alarm means to actuate the buzzer or lamp.

In the apparatus as described, since the sensor 10 is damaged once the leakage of sodium occurs, the sensor must be replaced with a new sensor after the repair of the leak. The time required for the detection of sodium leakage is controlled mainly by the time required for breaking the metal layer by corrosion. Thus, a higher sensitivity is obtained by adopting a thinner and less corrosion-resistant material for the metal layer.

Although the invention has been described in its preferred embodiment, it is understood that various changes and modifications may be made without departing from the spirit and scope of the invention which is limited solely by the appended claims.

What is claimed is:

1. An apparatus for detecting the leakage of liquid sodium through a wall of liquid sodium-containing equipment, said apparatus comprising:

an elongated cable-shaped sensor formed of an electrically conductive inner core wire, an electrically insulative layer consisting essentially of a metal oxide material surrounding said core wire, and an outer layer consisting essentially of a metal material surrounding said insulative layer and separated from said core wire by said insulative layer, said metal oxide material and said metal material being corrodible by the reaction products resulting from a reaction of liquid sodium with water vapor or oxygen in the atmospheric air, said cable-shaped sensor being deformable so that it may be conformed to the configuration of and directly secured to the wall of a liquid sodium-containing equipment at a position such that upon leakage of liquid sodium through the wall, reaction products are formed and contact said sensor and corrode said outer layer and insulative layer;

electric power supply means for applying a predetermined constant voltage between said core wire and the wall of a sodium-containing equipment, for thereby passing a relatively small current through said insulative layer and said outer layer between said core wire and the wall when there is no leakage of liquid sodium through the wall, and for passing an increased current between said core wire and the wall due to corrosion of said insulative layer upon leakage of liquid sodium through the wall; and leak current detector means, connected in series to said power supply means, for detecting said increase in current as an indication of the leakage of liquid sodium through the wall.

2. An apparatus as claimed in claim 1, wherein said leak current detector means includes comparator means for comparing the detected current passing between said core wire and the wall with a reference current and for generating an output when said detected current exceeds said reference current.

3. An apparatus as claimed in claim 2, further comprising alarm means attached to said comparator and adapted to be energized by said output.

4. An apparatus as claimed in claim 1, wherein said metal oxide material of said insulative layer is a material selected from the group consisting of magnesium oxide, beryllium oxide and aluminum oxide.

5. An apparatus as claimed in claim 1, wherein said metal material of said outer layer is a material selected from the group consisting of austenite stainless steel, copper and plain carbon steel.

6. In an assembly of the type including an equipment containing therein liquid sodium, and means for detecting the leakage of said liquid sodium through a wall of said equipment, the improvement therein said detecting means comprises:

an elongated cable-shaped sensor formed of an electrically conductive inner core wire, an electrically insulative layer consisting essentially of a metal oxide material surrounding said core wire and an outer layer consisting essentially of a metal material surrounding said insulative layer and separated from said core wire by said insulative layer, said metal oxide material and said metal material being corrodible by the reaction products resulting from a reaction of liquid sodium with water vapor or oxygen in the atmospheric air, said cable-shaped sensor being deformed to closely conform to the configuration of said wall and being directly secured to said wall of said equipment at a position such that upon leakage of said liquid sodium through said wall, reaction products are formed and contact said sensor and corrode said outer layer and insulative layer;

electric power supply means for applying a predetermined constant voltage between said core wire and said wall of said equipment, for thereby passing a relatively small current through said insulative layer and said outer layer between said core wire and said wall when there is no leakage of said liquid sodium through said wall, and for passing an increased current between said core wire and said wall due to corrosion of said insulating layer upon leakage of said liquid sodium through said wall; and leak current detector means, connected in series to said power supply means, for detecting said increase in current as an indication of the leakage of said liquid sodium through said wall.

7. The improvement claimed in claim 6, wherein said leak current detector means includes comparator means for comparing the detected current passing between said core wire and said wall with a reference current and for generating an output when said detected current exceeds said reference current.

8. The improvement claimed in claim 7, further comprising alarm means attached to said comparator and adapted to be energized by said output.

9. The improvement claimed in claim 6, wherein said metal oxide material of said insulative layer is a material selected from the group consisting of magnesium oxide, beryllium oxide and aluminum oxide.

10. The improvement claimed in claim 6, wherein said metal material of said outer layer is a material selected from the group consisting of austenite stainless steel, copper and plain carbon steel.

11. The improvement claimed in claim 6, wherein said equipment comprises a pipe having said liquid sodium conveyed therethrough, and said cable-shaped sensor is spirally wound about and in direct contact with the outer surface of said pipe.

* * * * *